US010919200B2

(12) United States Patent
Qian et al.

(10) Patent No.: US 10,919,200 B2
(45) Date of Patent: Feb. 16, 2021

(54) INJECTION MOLDING APPARATUS

(71) Applicant: MOLD-MASTERS (2007) LIMITED, Georgetown (CA)

(72) Inventors: Jiping Qian, Mississauga (CA); Kenneth Jacob, Tunkhannock, PA (US); Denis Babin, Georgetown (CA)

(73) Assignee: MOLD-MASTERS (2007) LIMITED, Georgetown (CA)

( * ) Notice: Subject to any disclaimer, the term of this patent is extended or adjusted under 35 U.S.C. 154(b) by 0 days.

(21) Appl. No.: 16/162,116

(22) Filed: Oct. 16, 2018

(65) Prior Publication Data

US 2019/0111600 A1 Apr. 18, 2019

Related U.S. Application Data

(60) Provisional application No. 62/573,444, filed on Oct. 17, 2017.

(51) Int. Cl.
*B29C 45/00* (2006.01)
*B29C 45/23* (2006.01)
(Continued)

(52) U.S. Cl.
CPC ........ *B29C 45/231* (2013.01); *B29C 45/2725* (2013.01); *B29C 45/281* (2013.01);
(Continued)

(58) Field of Classification Search
CPC .............. B29C 45/231; B29C 45/2806; B29C 2045/2791
See application file for complete search history.

(56) References Cited

U.S. PATENT DOCUMENTS 6,555,044 B2 4/2003 Jenko
2004/0131721 A1* 7/2004 Babin .................. B29C 45/231
425/549
(Continued)

FOREIGN PATENT DOCUMENTS

CN 103702817 A 11/2016
EP 0924045 * 6/1999 ......... B29C 45/1603
(Continued)

OTHER PUBLICATIONS

Extended European Search Report issued in European Application No. 18200746.8 dated Feb. 25, 2019.

*Primary Examiner* — Jacob T Minskey
*Assistant Examiner* — Adrien J Bernard
(74) *Attorney, Agent, or Firm* — Medler Ferro Woodhouse & Mills PLLC

(57) ABSTRACT

A melt delivery body is disclosed for an injection molding apparatus. The melt delivery body includes a manifold, housed in a manifold plate, having a melt network with an inlet for receiving melt from a machine nozzle and an outlet substantially axially aligned with the inlet. The melt delivery body further including an in-line valve gated nozzle having a nozzle melt channel, a valve pin in the nozzle melt channel, and a valve pin actuator coupled to the valve pin and positioned substantially axially aligned with the in-line valve gated nozzle and between the manifold and the in-line valve gated nozzle for controlling the movement of the valve pin within the nozzle melt channel. The melt delivery body further including a biasing member for biasing the in-line valve gated nozzle towards the manifold.

9 Claims, 8 Drawing Sheets

(51) Int. Cl.
  *B29C 45/28*  (2006.01)
  *B29C 45/27*  (2006.01)
  *B29L 31/30*  (2006.01)

(52) U.S. Cl.
  CPC .. *B29C 45/2806* (2013.01); *B29C 2045/2791* (2013.01); *B29L 2031/3044* (2013.01)

(56) References Cited

U.S. PATENT DOCUMENTS

| | | |
|---|---|---|
| 2008/0017110 A1 | 7/2008 | Bouti |
| 2008/0171100 A1* | 7/2008 | Bouti .................. B29C 45/2725 425/569 |
| 2009/0194910 A1 | 8/2009 | Rosner et al. |
| 2010/0183763 A1* | 7/2010 | Babin .................... B29C 45/27 425/549 |
| 2013/0309349 A1* | 11/2013 | Blais .................. B29C 45/2737 425/549 |
| 2018/0272587 A1* | 9/2018 | Galati .................... B29C 45/76 |

FOREIGN PATENT DOCUMENTS

| | | |
|---|---|---|
| EP | 0924045 A1 | 6/1999 |
| WO | 2012/148870 A1 | 11/2012 |

* cited by examiner

INJECTION MOLDING APPARATUS

CROSS-REFERENCE TO RELATED APPLICATION

The present application claims the benefit of prior U.S. Appl. No. 62/573,444, filed Oct. 17, 2017, which is incorporated by reference herein in its entirety.

FIELD

The invention relates generally to an injection molding apparatus and, in particular, to a melt delivery body having an in-line valve gated nozzle.

BACKGROUND

Injection molding apparatuses can use in-line valve gated nozzle to mold large articles such as automotive bumpers. An in-line valve gated nozzle is a nozzle that is in a linear configuration with a machine nozzle and a gate of a mold cavity; the arrangement can increase the risks of melt leakage between various components involved, due to heat expansion of the various components involved.

SUMMARY

According to an aspect of this application, there is provided a melt delivery body for an injection molding apparatus including a manifold plate and a machine nozzle to deliver a melt to the melt delivery body, the melt delivery body comprising: a manifold, housed in the manifold plate, including a melt network having an inlet for receiving melt from the machine nozzle and an outlet substantially axially aligned with the inlet; an in-line valve gated nozzle having a nozzle melt channel for delivering melt from the manifold to a mold cavity, the nozzle melt channel substantially axially aligned with the inlet; a valve pin in the melt channel to regulate the rate the melt is dispensed from the in-line valve gated nozzle; an valve pin actuator coupled to the valve pin and positioned substantially axially aligned with the in-line valve gated nozzle and between the manifold and the in-line valve gated nozzle for controlling the movement of the valve pin within the nozzle melt channel; and a biasing member for biasing the in-line valve gated nozzle towards the manifold.

The melt delivery body can further comprise a coupler and an inlet body coupling the in-line valve gated nozzle to the manifold, the coupler defining a coupler melt channel and the inlet body defining an inlet body melt channel, the coupler melt channel and the inlet body melt channel together define a connector melt channel to deliver the melt from the outlet to the nozzle melt channel.

The inlet body can include a passageway housing a connector connected to a pin head of the valve pin, the valve pin actuator can include a piston coupled to a connector to move the connector axially along the passageway.

The melt delivery body can further comprise a retainer attached to a downstream end of the valve pin actuator housing the biasing member.

The melt delivery body can further comprise a locator to align the inlet body melt channel with the outlet.

The inlet body melt channel can include two branches circumventing the pin head connecting the outlet with the nozzle melt channel.

The coupler and the inlet body can be separate components attached to each other.

The coupler and the inlet body can be an integral component.

The coupler can be threadably connected with the in-line valve gated nozzle.

The coupler can be not heated.

The biasing member can be a Belleville spring.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

The following detailed description is exemplary in nature and is not intended to limit the concepts or uses of the concepts. There is no intention to be restricted by any expressed or implied theory in the present disclosure. In the description, melt means a material (e.g., plastic) in a molten state that can be used to mold an article, "downstream" means the direction of the melt flow from a source to a mold cavity, and "upstream" means the opposite direction of downstream.

Figure 1:
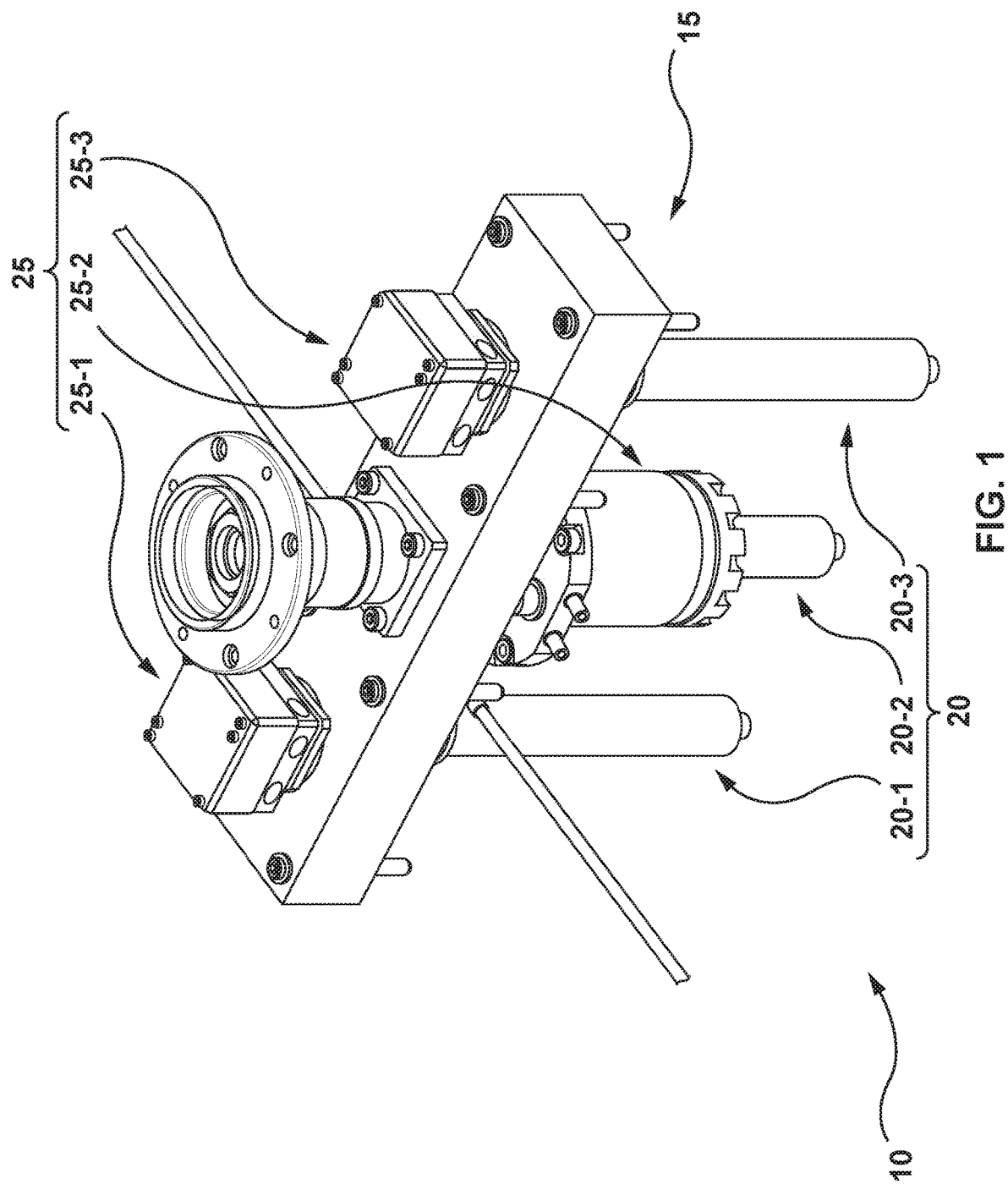
FIG. 1 is a top perspective view of a melt delivery body in accordance with an embodiment of the present application.
Figure 8:
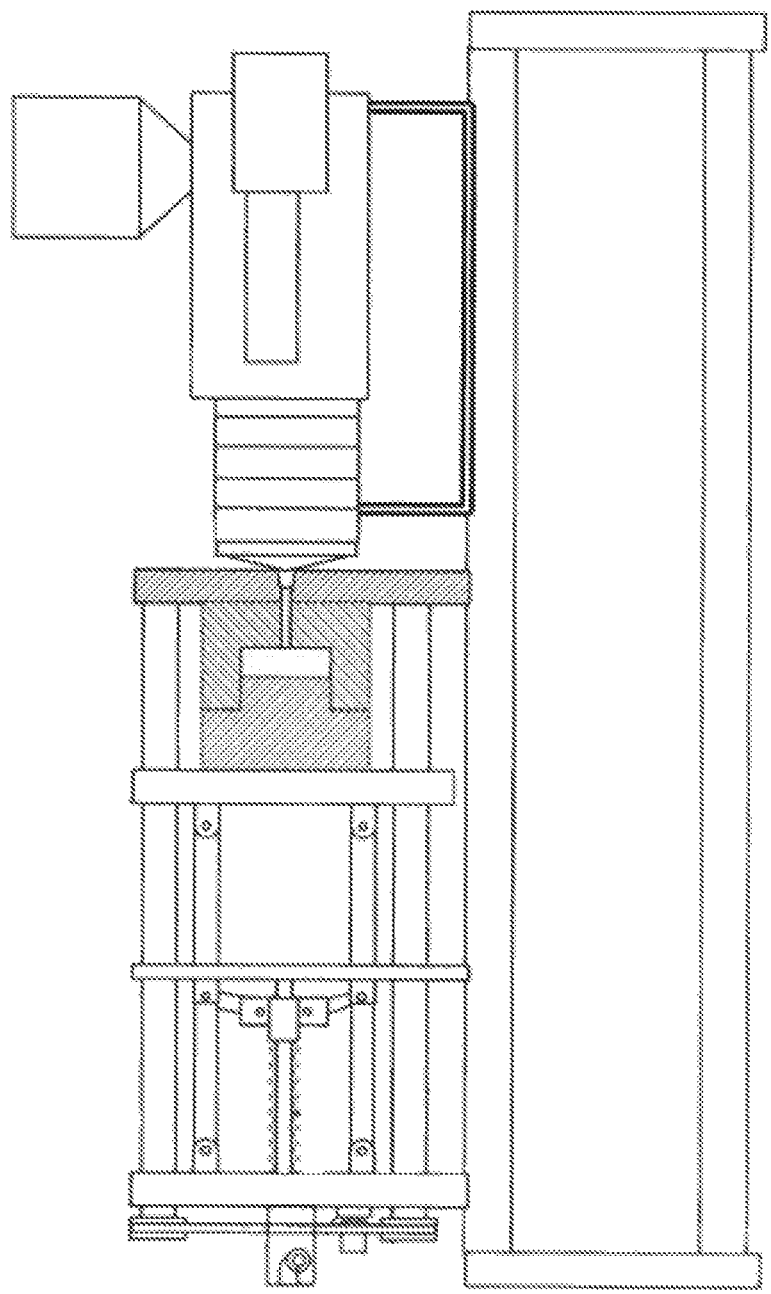
FIG. 8 is an example injection molding apparatus.

Referring to FIG. 1 (a top perspective view of a melt delivery body in accordance with an embodiment of the present application generally referred to as melt delivery body 10), melt delivery body 10 includes a manifold 15, one or more than one nozzle 20 (individually, as nozzles 20-1, 20-2, and 20-3, and generally as nozzle 20), and one or more than one valve pin actuator 25 (individually, as valve pin actuator 25-1, 25-2, and 25-3, and generally as valve pin actuator 25). In the illustrated embodiment, nozzle 20-2 is an in-line valve gated nozzle (nozzle 20-2 may be referenced below as in-line valve gated nozzle 20-2). Nozzles 20 each include a nozzle melt channel 102 (see FIG. 3) for delivering melt from manifold 15 to a mold cavity (not shown). Melt delivery body 10 is for use in an injection molding apparatus (exemplify by the apparatus in FIG. 8) including a manifold plate 80 and a machine nozzle 82 to deliver a melt (not shown) to melt delivery body 10, see FIG. 3.

Figure 2:
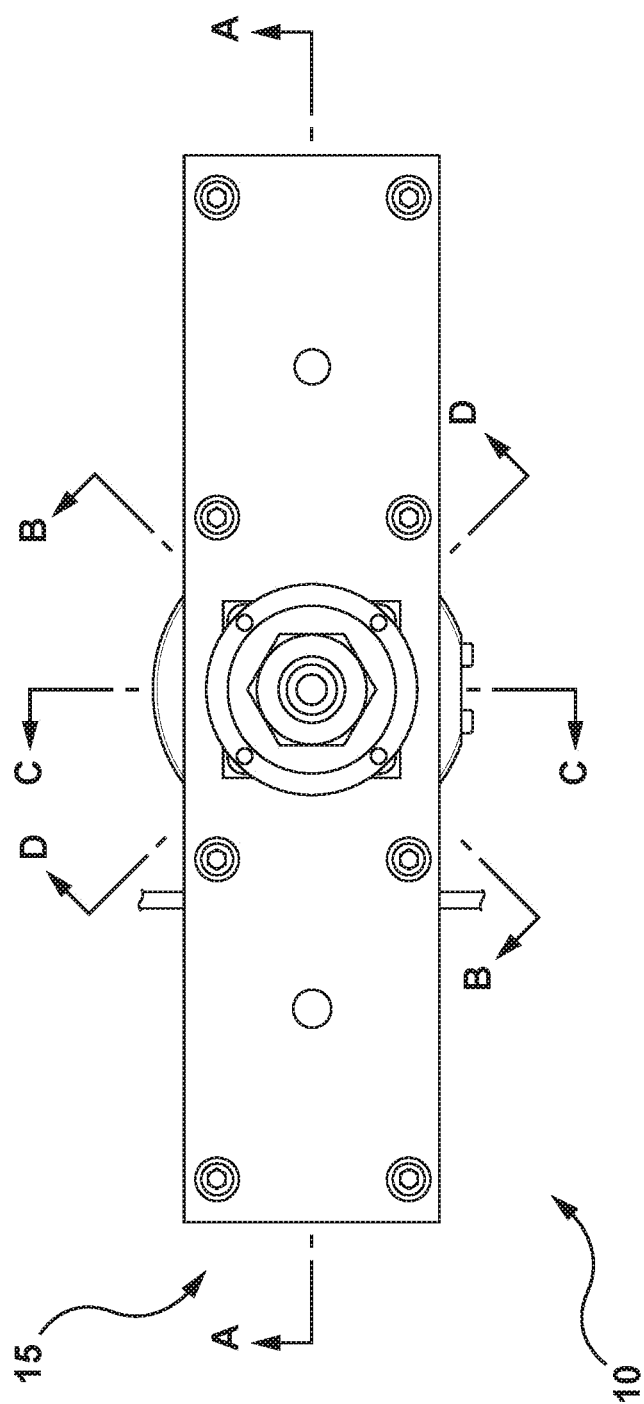
FIG. 2 is a top view of the melt delivery body of FIG. 1.
Figure 3:
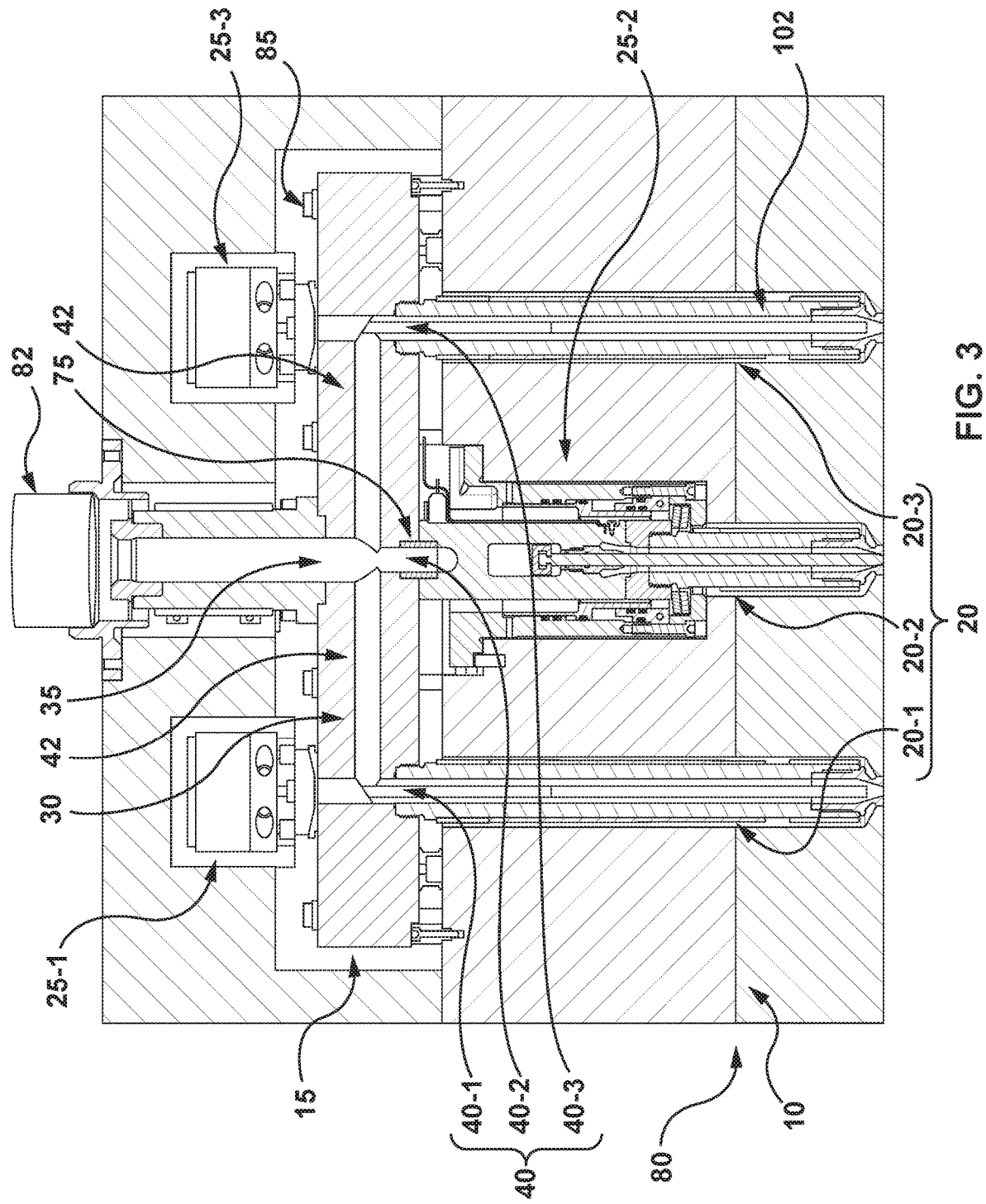
FIG. 3 is a section view of a portion of the melt delivery body of FIG. 1 taken along line A-A of FIG. 2.

Referring to FIG. 3 (a section view of a portion of melt delivery body 10 of FIG. 1 taken along line A-A of FIG. 2, a top view of the melt delivery body of FIG. 1), manifold 15 defines a melt network 30 to distribute a melt from a source (not shown), via machine nozzle 82, to more than one destination such as nozzles 20. Melt network 30 includes an inlet 35 to receive the melt from the source, more than one outlet 40 (individually, as outlet 40-1, 40-2, and 40-3, and generally as outlet 40) to distribute the melt to respective nozzles 20, and more than one melt channel 42 interconnecting inlet 35 with outlets 40. Outlet 40-2 is substantially axially aligned with inlet 35. In the illustrated embodiment, valve pin actuator 25-2 is positioned between inlet 35 and a nozzle melt channel 102 of nozzle 20-2. Normally, actuators are located upstream of the manifold, as exemplified by valve pin actuators 25-1, 25-3. However, because nozzle 20-2 is substantially axially aligned with and downstream from inlet 35 and inlet 35 is for receiving melt from a source, via machine nozzle 82, valve pin actuator 25-2 cannot be located upstream of and substantially axially aligned with inlet 35. Because of the location of valve pin actuator 25-2 (i.e., between manifold 15 and in-line valve gated nozzle 20-2), the shortest path from outlet 40-2 to its respective nozzle 20-2 is through valve pin actuator 25-2.

Figure 4:
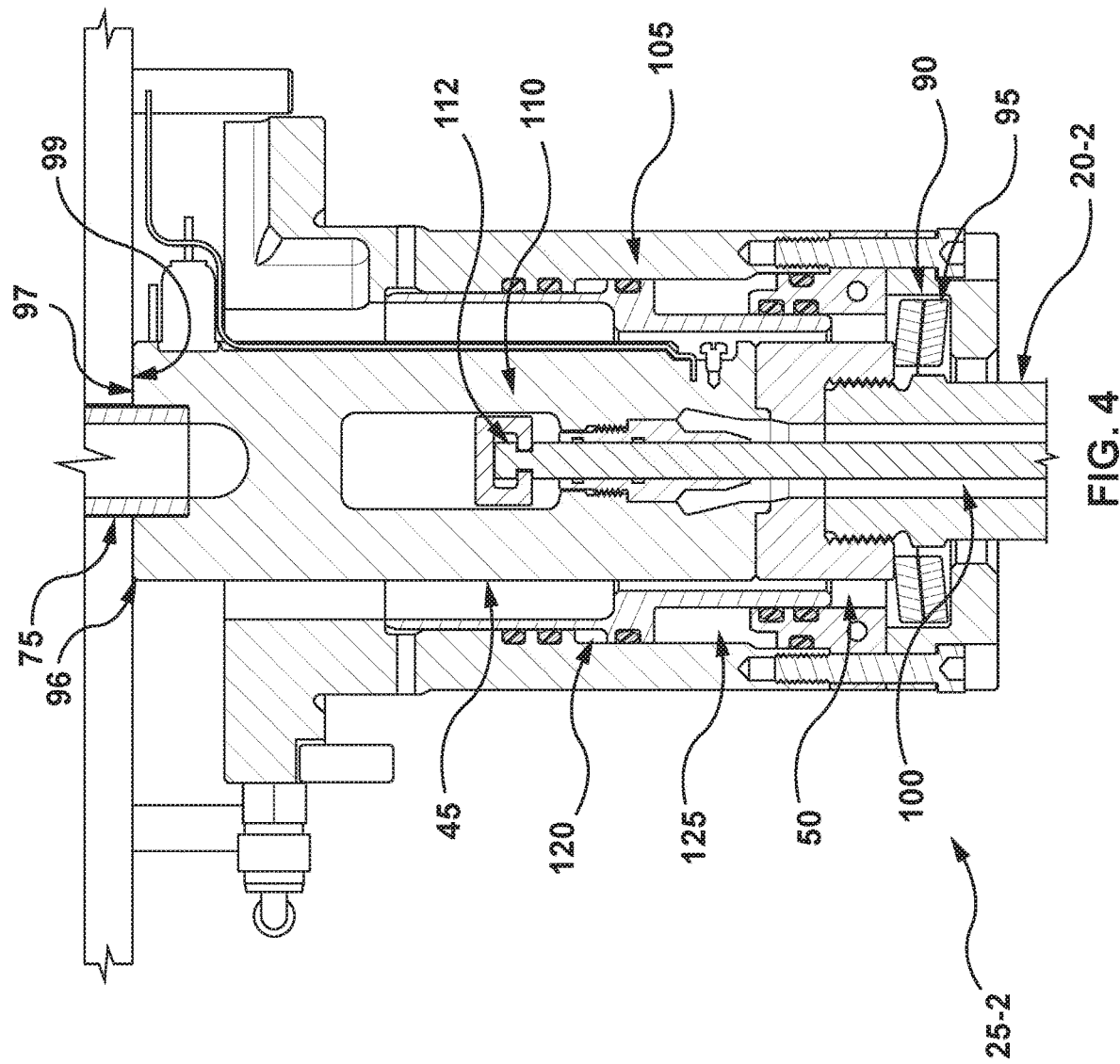
FIG. 4 is a section view of a valve pin actuator of FIG. 1 taken along line A-A of FIG. 2.
Figure 5:
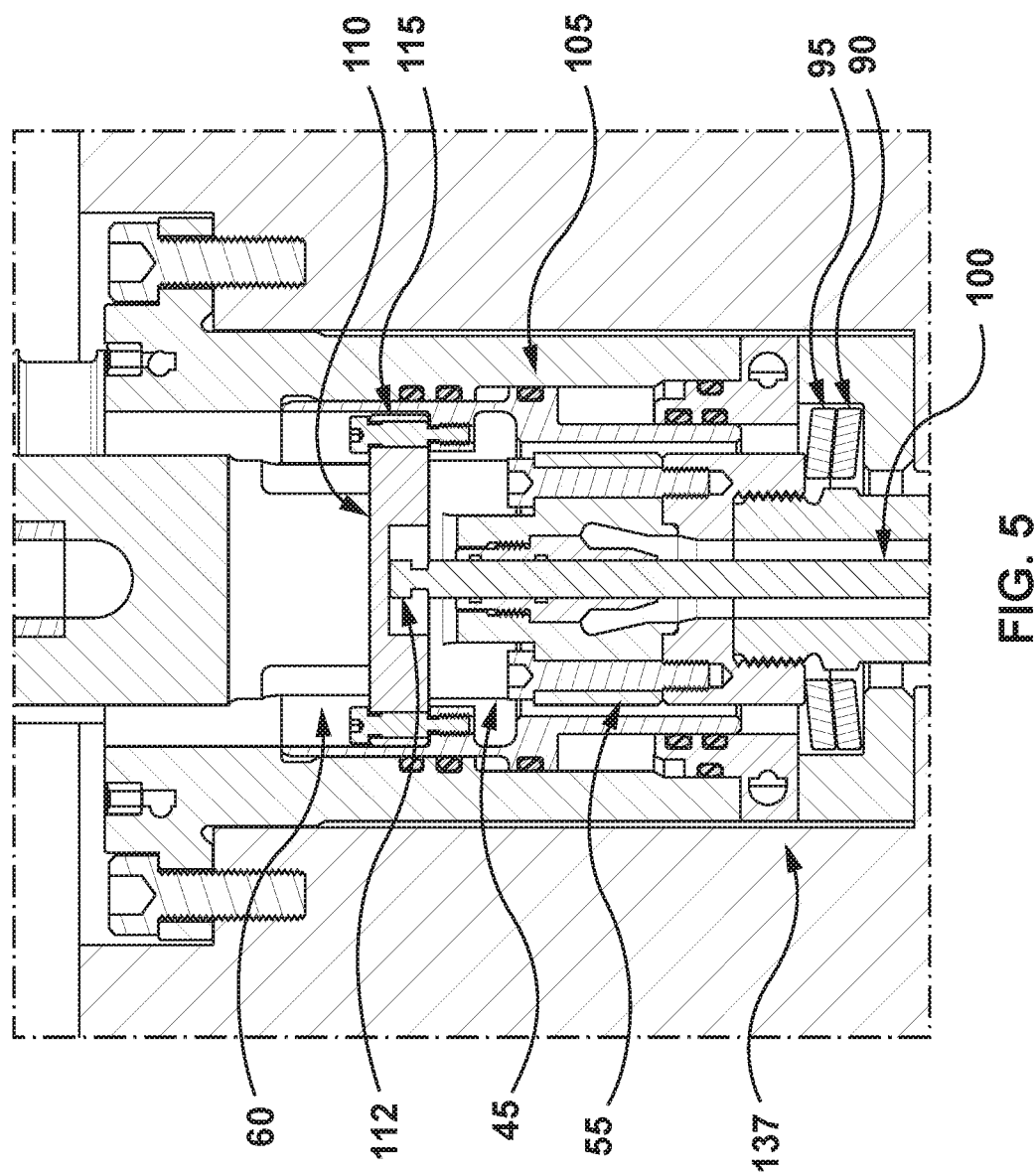
FIG. 5 is a section view of a valve pin actuator of FIG. 1 taken along line B-B of FIG. 2.
Figure 6:
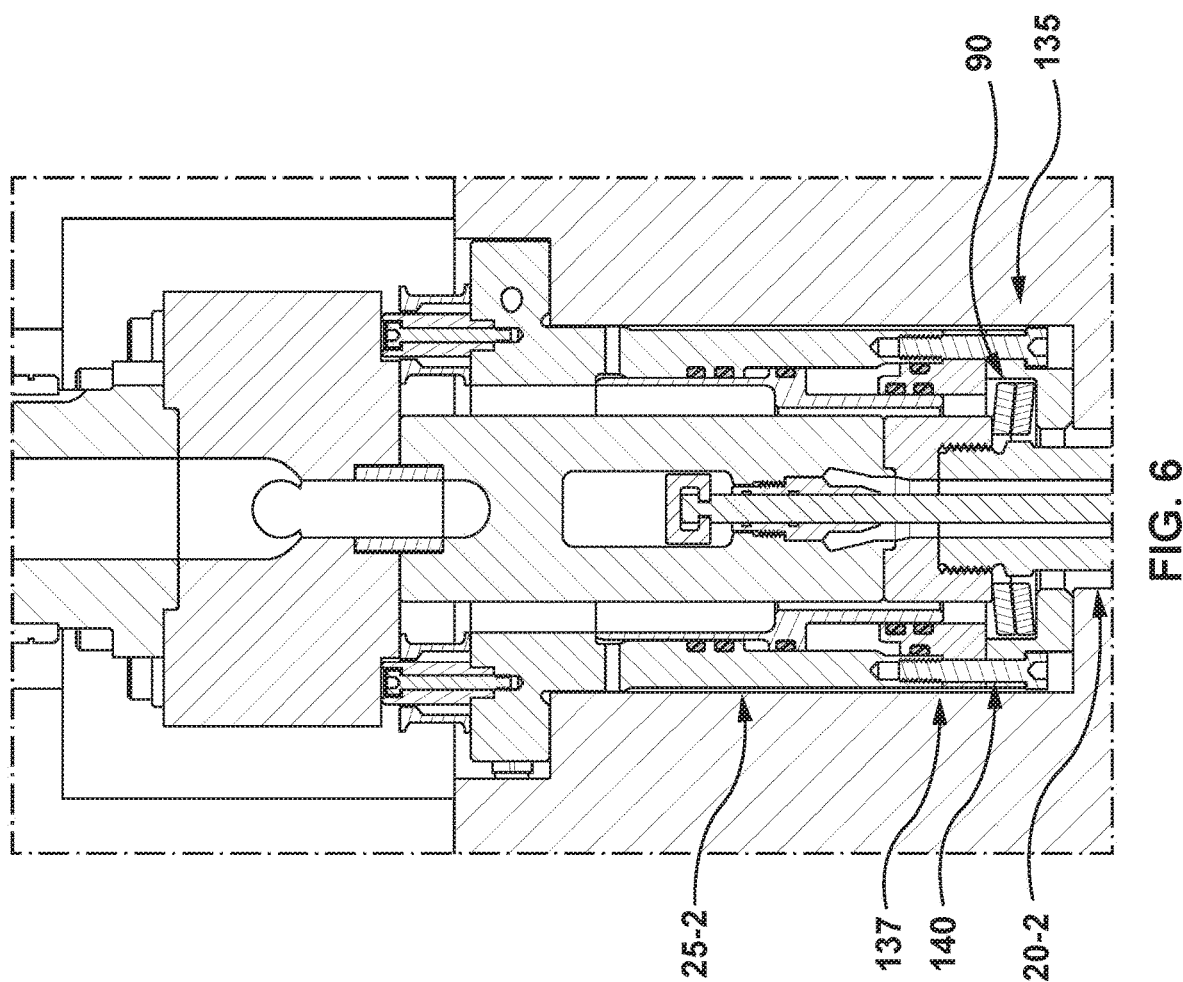
FIG. 6 is a section view of a valve pin actuator of FIG. 1 taken along line C-C of FIG. 2.
Figure 7:
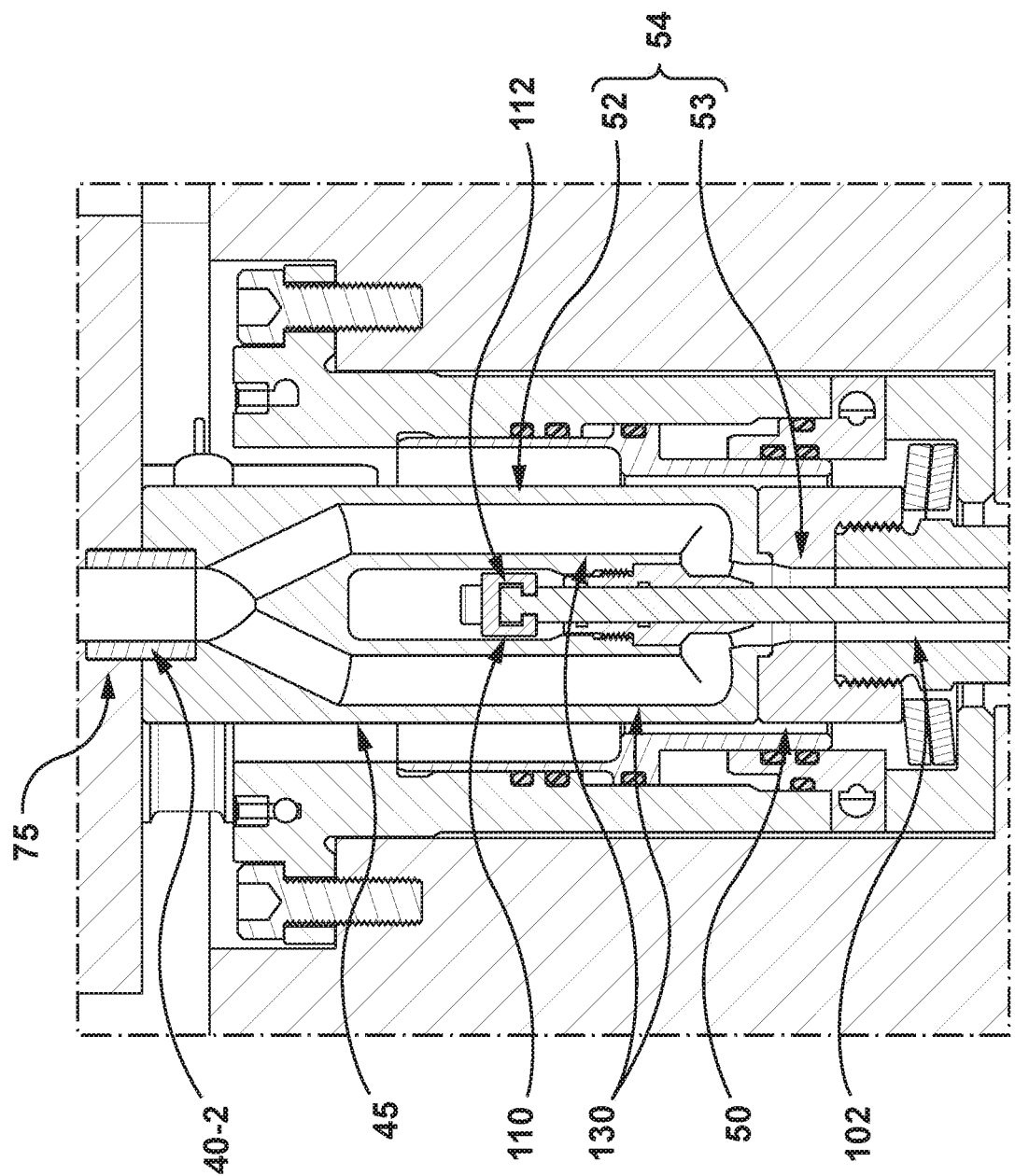
FIG. 7 is a section view of a valve pin actuator of FIG. 1 taken along line D-D of FIG. 2.

Referring to FIG. 4 (a section view of valve pin actuator 25-2 of FIG. 1 taken along line A-A of FIG. 2), melt delivery body 10 includes an inlet body 45 for conveying the melt from manifold 15 to nozzle 20-2 and a coupler 50 for coupling inlet body 45 to nozzle 20-2. Coupler 50 is threadably attached to nozzle 20-2 and attached to inlet body 45 via screws 55 (see FIG. 5, a section view of valve pin actuator 25-2 of FIG. 1 taken along line B-B of FIG. 2). Inlet body 45 includes an inlet body melt channel 52 and coupler 50 includes a coupler melt channel 53; both inlet body melt channels 52 and coupler melt channel 53 together define a connector melt channel 54 to deliver melt from outlet 40-2 to nozzle 20-2 (see FIG. 7, a section view of valve pin actuator 25-2 of FIG. 1 taken along line D-D of FIG. 2). Inlet body melt channel 52 includes two branches 130 circumventing pin head 112 (see FIG. 7) and connecting outlet 40-2 with nozzle melt channel 102 of in-line valve gated nozzle 20-2. In the illustrated embodiment, coupler 50 is not heated. However, depending on the application, coupler 50 can be heated. In some embodiments, coupler 50 can be integrated with inlet body 45 as a unitary body (not shown). Inlet body 45 includes a diametrically extending passageway 60, extending along the line B-B of FIG. 2. (That is, passageway 60 is a through bore extending from a first location on the exterior surface of inlet body 45 to a second location that is diametrically opposed to the first location on the exterior surface of inlet body 45.) A locator 75 aligns inlet body melt channel 52 with outlet 40-2. Melt delivery body 10 is housed in a manifold plate 80 (of the injection molding apparatus). Bolts 85 secure manifold 15 to manifold plate 80 (see FIG. 3). Melt delivery body 10 includes a biasing member 90 for biasing in-line valve gated nozzle 20-2 towards manifold 15. In the illustrated embodiments, biasing member 90 includes at least one Belleville spring 95. Referring to FIG. 6 (a section view of a valve pin actuator of FIG. 1 taken along line C-C of FIG. 2), melt delivery body 10 includes a retainer 135 and screws 140 to attach retainer 135 to a downstream end 137 of valve pin actuator 25-2. Retainer 135 houses biasing member 90 and a portion of nozzle 20-2. When bolts 85 are torqued to a level suitable to an application, the pressure from the biasing member 90 urges inlet body 45 to abut manifold 15 to prevent melt from escaping between the interface between inlet body 45 and manifold 15. In operation, inlet body 45 is heated to an operating temperature to maintain the melt in inlet body melt channel 52 at a desirable state. Heating inlet body 45 causes inlet body 45 to expand because of heat expansion. Biasing member 90 accommodates for the heat expansion of inlet body 45 and urges inlet body 45 against manifold 15 to reduce the risks of the melt leaking from melt delivery body 10 via a location 96 where an upstream surface 97 of inlet body 45 engages a downstream surface 99 of manifold 15 (see FIG. 4).

Melt delivery body 10 includes a valve pin 100 positioned in each nozzle melt channel 102 to regulate the melt dispensed from nozzles 20. Valve pin actuator 25-2 includes a piston 105 for reciprocating valve pin 100 to regulate the rate of the melt dispensed from nozzle 20-2. Piston 105 is annular to accommodate the components (e.g., inlet body 45 and coupler 50) passing through piston 105. Valve pin 100 is coupled to piston 105 via a connector 110 (see FIG. 4 and FIG. 5). Connector 110 is a dimensioned to extend through passageway 60. That is, passageway 60 houses connector 110 and the ends of connector 110 extends beyond the exterior surface of inlet body 45. Piston 105 can move connector 110 axially along passageway 60 (i.e., along the direction of melt flow). Valve pin 100 includes a pin head 112 for coupling with connector 110. In the illustrated embodiments, connector 110 is attached to piston 105 via screws 115 (see FIG. 5). Valve pin actuator 25-2 includes a first chamber 120 and a second chamber 125 (see FIG. 4). First chamber 120 is for receiving a working fluid (not shown) to move piston 105 downstream and because piston 105 is coupled to valve pin 100 the downstream movement of piston 105 is imparted on to valve pin 100 causing valve pin 100 to move downstream (for example, to close a gate of a cavity (both not shown) in communication with nozzle 20-2). Second chamber 125 is for receiving a working fluid (not shown) to move piston 105 upstream causing valve pin 100 to move upstream (for example, to open a gate of a cavity (both not shown) in communication with nozzle 20-2).

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by the above-described exemplary embodiments, but should be defined only in accordance with the appended claims and their equivalents. It will also be understood that each feature of each embodiment discussed herein, and of each reference cited herein, may be used in combination with the features of any other embodiment.

What is claimed is:

1. A melt delivery body for an injection molding apparatus including a manifold plate and a machine nozzle to deliver a melt to the melt delivery body, the melt delivery body comprising:

a manifold, housed in the manifold plate, including a melt network, the melt network having
an inlet for receiving the melt from the machine nozzle,
outlets, with each outlet of the outlets for distributing the melt to a respective nozzle, and
melt channels interconnecting the inlet with the outlets, wherein a first outlet of the outlets is substantially axially aligned with the inlet;

an in-line valve gated nozzle aligned in a linear configuration with the machine nozzle and a gate of a mold cavity, the in-line valve gated nozzle having a nozzle melt channel for receiving the melt from the first outlet of the melt network of the manifold and delivering the melt to the mold cavity, the nozzle melt channel of the in-line valve gated nozzle being substantially axially aligned with the inlet and the first outlet of the melt network;

a coupler and an inlet body coupling the in-line valve gated nozzle to the manifold, wherein the coupler defines a coupler melt channel and the inlet body defines an inlet body melt channel, the coupler melt channel and the inlet body melt channel together defining a connector melt channel to deliver the melt from the first outlet of the melt network of the manifold to the nozzle melt channel of the in-line valve gated nozzle;

a valve pin disposed in the nozzle melt channel of the in-line valve gated nozzle to regulate a rate at which the melt is dispensed from the in-line valve gated nozzle;

a valve pin actuator coupled to the valve pin, the valve pin actuator being positioned between the manifold and the in-line valve gated nozzle and being substantially axially aligned with the in-line valve gated nozzle, the valve pin actuator for controlling movement of the valve pin within the nozzle melt channel of the in-line valve gated nozzle; and a retainer attached to a downstream end of the valve pin actuator, the retainer housing a biasing member and an upstream portion of the in-line valve gated nozzle, the biasing member being positioned to bias the in-line valve gated nozzle and the inlet body towards the manifold, and being positioned to accommodate heat expansion of the inlet body.

2. The melt delivery body of claim 1, wherein the inlet body includes a passageway housing a connector connected to a pin head of the valve pin, the valve pin actuator including a piston coupled to the connector to move the connector axially along the passageway.

3. The melt delivery body of claim 1 further comprising a locator to align the inlet body melt channel with the first outlet of the melt network of the manifold.

4. The melt delivery body of claim 2, wherein the inlet body melt channel includes two branches circumventing the pin head, the two branches connecting the first outlet of the melt network of the manifold with the nozzle melt channel of the in-line valve gated nozzle.

5. The melt delivery body of claim 1, wherein the coupler and the inlet body are separate components attached to each other.

6. The melt delivery body of claim 1, wherein the coupler and the inlet body are a unitary body.

7. The melt delivery body of claim 1, wherein the coupler is threadably connected with the in-line valve gated nozzle.

8. The melt delivery body of claim 1, wherein the coupler is not heated.

9. The melt delivery body of claim 1, wherein the biasing member is a Belleville spring.

* * * * *